No. 679,271. Patented July 23, 1901.
C. W. BARNEKOV.
CAMERA.
(Application filed July 5, 1900.)

(No Model.) 2 Sheets—Sheet 1.

WITNESSES:
C. R. Delany
L. Blair

INVENTOR
Charles W. Barnekov
BY
[signature]
ATTORNEY

THE NORRIS PETERS CO., PHOTO-LITHO., WASHINGTON, D. C.

No. 679,271. Patented July 23, 1901.
C. W. BARNEKOV.
CAMERA.
(Application filed July 5, 1900.)
(No Model.) 2 Sheets—Sheet 2.

WITNESSES:
C. Q. Dulany
L. Blair

INVENTOR
Charles W. Barnekov
BY
A. J. Zerbe
ATTORNEY

UNITED STATES PATENT OFFICE.

CHARLES W. BARNEKOV, OF PERTH AMBOY, NEW JERSEY, ASSIGNOR OF ONE-HALF TO FREDERICK E. WOOD, OF NEW YORK, N. Y.

CAMERA.

SPECIFICATION forming part of Letters Patent No. 679,271, dated July 23, 1901.

Application filed July 5, 1900. Serial No. 22,512. (No model.)

*To all whom it may concern:*

Be it known that I, CHARLES W. BARNEKOV, a citizen of the United States, and a resident of Perth Amboy, in the county of Middlesex and State of New Jersey, have invented certain new and useful Improvements in Cameras, of which the following is a specification.

The object of the present invention is to construct an improved camera which will contain several new and novel features, one of them being the manner of removing the plate-magazine from the interior of the camera whenever the operator may desire to focus an object on a ground-glass surface provided for that purpose for each picture taken; and it also provides means whereby the operator may use it continuously as a snap-shot magazine-camera, or, on the other hand, it may be used to take snap-shot and focus pictures alternately, if desired. As a surface upon which to project the object to be photographed, I provide a ground-glass door hinged in such a way as to enable its being swung back out of the way within a recess formed in the wall of the compartment within which the magazine plate-holder rests.

Figure 1:
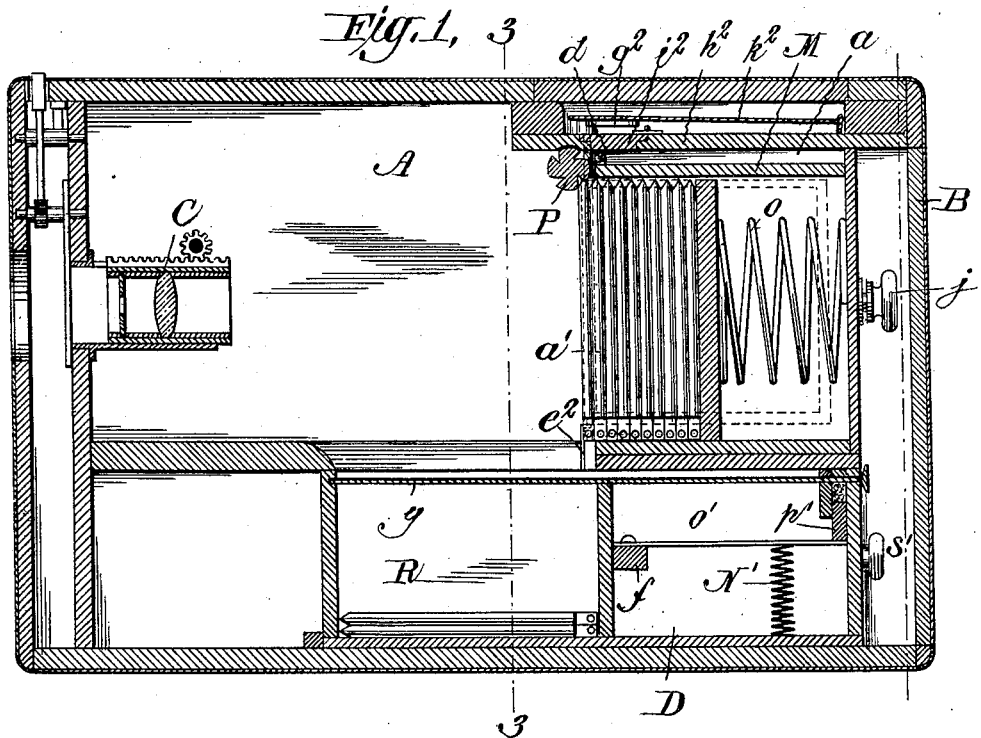
Figure 2:
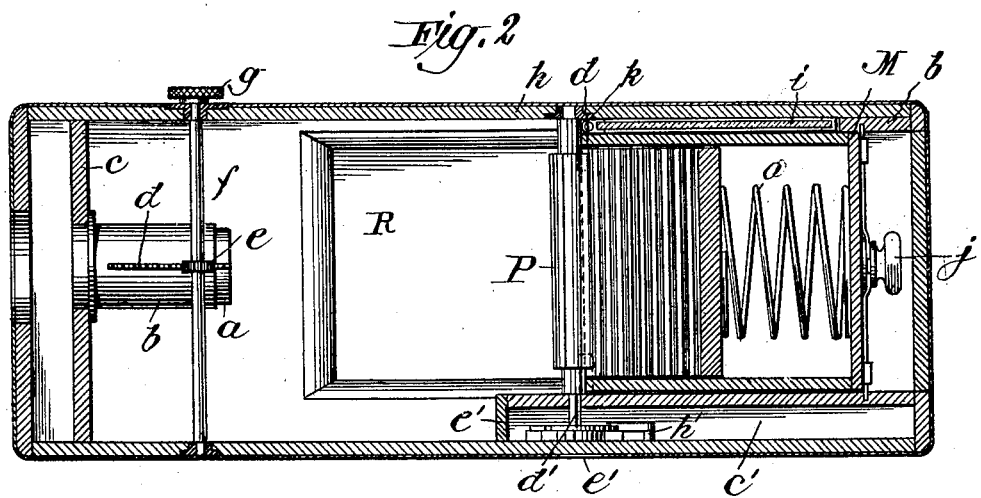
Figure 3:
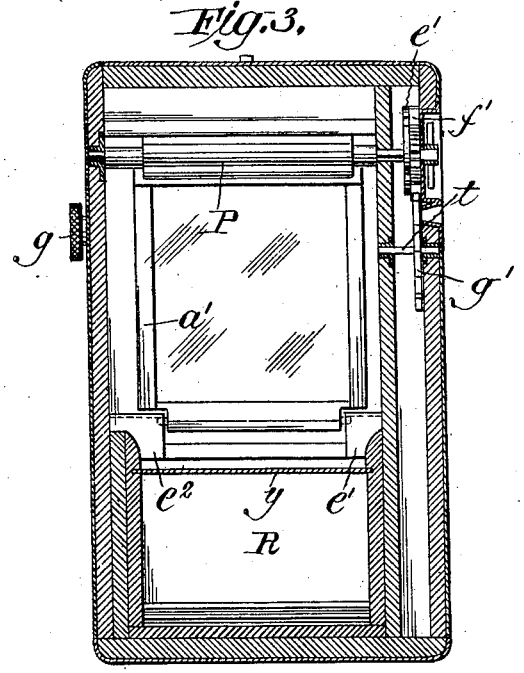
Figure 4:
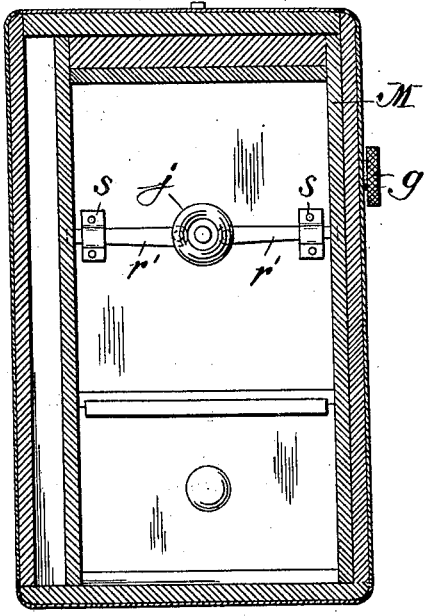
Figure 5:
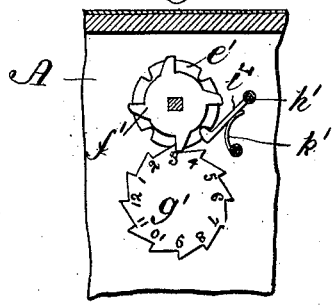
Figure 6:
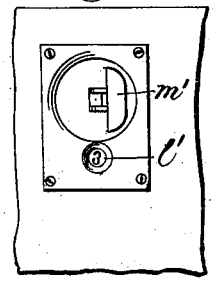
Figure 7:
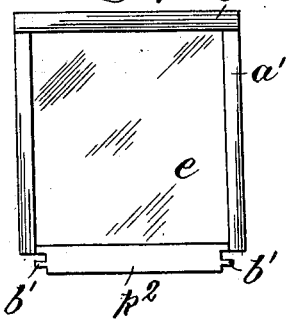
Figure 8:

In the drawings, Figure 1 is a central vertical longitudinal section showing the relative arrangement of the parts of my improved camera. Fig. 2 is a horizontal section with the upper part of the camera-case removed. Fig. 3 is a transverse section through line 3 3 of Fig. 1. Fig. 4 is a transverse section through line 4 4 of same looking in the opposite direction. Fig. 5 is an end view of the plate-tripping mechanism and of the numbered disk, which serves to indicate the number of photographs taken; Fig. 6, a view of handle which operates the tripping mechanism and point at which number of exposed plates is indicated; Fig. 7, a side view of plate held in special form of frame; Fig. 8, an edge view of same.

In Fig. 1, C represents a focusing-lens similar to those now in use in the ordinary form of camera. At the opposite end of the case and of approximately one-half the length of same I provide a compartment $a$, designed to hold the magazine plate-holder M. The wall $b$ of this compartment is recessed and a plate-glass door $i$, which is hinged at $k$, Fig. 2, is intended to be swung into this recess when not in use. Directly above the point $k$ a small crank $g^2$ is rigidly attached to the door, so that when the magazine plate-holder M is removed from the camera the user may swing the door $i$ out, so that it will be parallel with the focusing-lens C and adapted to receive the projected image from the lens. To admit of the removal of the plate-holder M from the compartment within which it rests the rear end of the case A is provided with a door, through which after the plate-holder is taken out the operator views the ground-glass door and is enabled by adjustment of the lens C to secure the desired focus. To enable one to have access to the top of the plates in the holder M, I provide in the top of the compartment $a$ a small trap-door $i^2$, which is so arranged as to fit snugly in place in order to exclude all light from the interior of the compartment. At the rear end of the magazine M, I provide a coiled spring $o$, which serves to feed the unexposed plates $a'$ toward a star-wheel P, which after the plates have been exposed trips it into a receptacle R. When it is desired to remove the magazine plate-holder M from the compartment $a$, the trap-door $i^2$ is raised and a slide is inserted between the plate in engagement with the star-wheel P and the one next adjoining it, and pushed downwardly until the lower end of the said slide has passed into a recess $e^2$ in the bottom of the said compartment. This will serve to keep the plates within the magazine-holder when same is removed from the compartment and will at the same time exclude all light from entering into the magazine or spoiling the plates therein. Directly adjoining the plate-magazine compartment $a$ is another compartment $c'$, Fig. 2, within which is a wheel $e'$, mounted on the shaft $d$ of the star-wheel P, and secured to the face of the wheel is a ratchet $f'$ in vertical alinement with and designed to engage another ratchet-wheel $g'$, mounted on a shaft $t$, Fig. 3, and having numerals printed on its face near the periphery, as shown. At $h'$ I pivot to the side wall of the case A, Fig. 5, a pawl $i'$, which is held in engagement with the wheel $e'$ by means of a small spring $k'$, which prevents any backward movement of the indicating mechanism. Thus in operation the handle $m'$ when turned to the right causes the wheel $f'$ to rotate, thereby imparting movement to the numbered disk $G'$ and causing a new number to appear at the point $l'$ at every quarter-turn of the star-wheel or as each plate $a'$ is successively exposed and tripped into the receptacle R. In the rear of the exposed-plate receptacle R is a small compartment D, on the bottom of which is attached a spiral spring $N'$, which presses upwardly against a diaphragm $o'$, one end of which is rigidly secured to a shoulder $f$. The other end presses upwardly against another shoulder or block $p'$, which fits into a recess partially filled with felt or other suitable soft material designed to fill the crevices and to exclude all light from entering the rear of the compartment R.

$y$ is a sliding top which is adapted to be removed when it is desired to deposit exposed plates into or take them out of the receptacle R.

$S'$ is a small handle or knob which is used for the purpose of withdrawing the receptacle from the case.

In Fig. 4 $j$ illustrates a small knob which serves the double purpose of fastening the magazine within the case and of being used as a handle for withdrawing the magazine. The arms $r'$, which are pivoted to opposite sides of the knob, pass through the brackets $s\ s$ and are adapted to engage with recesses in the walls of the compartment $a$ to securely hold the magazine within the camera.

In Figs. 7 and 8, which illustrate the frame which holds the plates, it will be observed that this frame consists of a main body $e$ and was virtually a cap or cover $f$, the latter being brought to a point or a sharp edge, as will be noted in Fig. 8. The lower portion of the body within which the plate rests has a lower projecting portion $k^2$, which is provided on either side with wings $b'\ b'$. Thus in operation the magazine-holder M is first removed from the camera and the ground-glass door $i$ is swung outwardly from the recess in which it normally rests to a point which brings it against the star-wheel P at right angles with the focusing-lens C. The lens is now adjusted to the proper focus, which the operator determines by the image which is projected on the ground-glass door, and the latter is then swung back into the recess within which it originally rested. The magazine M, with its supply of plates therein, is then inserted in the compartment $a$ and locked therein. The metal plate resting in the recesses in the top and bottom of the magazine, thereby holding the fresh plates therein, is then removed by withdrawing same upwardly through the trap-door $i^2$. The plates being thus released move forward until the first one is directly over the recess $e^2$ and its upper edge is in engagement with the star-wheel P. After the exposure of this plate the operator turns the handle $m'$ until a new figure appears at the point $l$, which indicates that the star-wheel has moved one-fourth revolution. The upper portion of the plate being released allows it to fall forward and the wings $b'\ b'$ slide down the recess $e^2$, thus depositing the plate on the slide $y$, which forms the top of the receptacle R. On the partial withdrawal of this slide the exposed plate is then permitted to drop into the bottom of the receptacle, after which the top may be returned to its place, if desired. It will be observed that as each plate after exposure has been dropped into the receiving-tray the plate immediately adjoining is brought into engagement with the star-wheel, and all the plates are thus successively fed to the point of exposure and lowered into the receiving-compartment below.

If the operator should desire to develop any of the plates before the supply within the magazine is exhausted, it is obvious that this can be done by removing the receptacle R, containing such plates as he may wish to develop. To guard against the possibility of any light coming in contact with the unexposed plates, a slide may be inserted at the point $d$ through the trap-door $i^2$, as heretofore referred to, and the one plate on the outside of said slide exposed dropped into the receptacle R and the latter removed with its contents.

If another focus should now become desirable, the magazine may be removed without possibility of damage to any of the fresh plates, and thus a different focus may be secured for each plate.

What I claim as new is—

1. In a magazine-camera an exterior case or shell having a recess located in the side thereof, in combination with a ground-glass focusing-screen hinged at its forward end within said recess, and a removable plate-holder having a slide at the front thereof, substantially as set forth.

2. In a magazine-camera the combination of a case, a focusing-screen hinged to said case and resting at one side of the plate-magazine and adapted to be swung into the focusing-line only when said magazine is removed, and a slide adapted to be inserted through an opening in the top of the case to enable the magazine plate-holder to be removed between the successive exposures for focusing purposes, substantially as set forth.

3. A magazine-camera, having therein a focusing-screen, hinged at its forward end within a recess in the wall of the case, and normally resting alongside of the plate-holder, said screen being adapted to be swung out to the focusing-line, in combination with a compartment having therein a removable magazine plate-holder, said magazine being adapted to receive a slide through a lateral opening in the case, for excluding light when it is removed from the camera between successive exposures, and means for feeding the plates to the point of exposure, as set forth.

Signed at New York, in the county of New York and State of New York, this 9th day of May, A. D. 1900.

CHARLES W. BARNEKOV.

Witnesses:
C. E. HOLLAND,
A. J. ZERBE.